UNITED STATES PATENT OFFICE.

VICTOR MORITZ GOLDSCHMIDT, OF CHRISTIANIA, NORWAY, ASSIGNOR TO TITAN CO. A/S., OF CHRISTIANIA, NORWAY.

PIGMENT CONTAINING TITANIUM-OXYGEN COMPOUND.

1,343,447. Specification of Letters Patent. Patented June 15, 1920.

No Drawing. Application filed May 10, 1917, Serial No. 167,837. Renewed October 25, 1919. Serial No. 333,429.

*To all whom it may concern:*

Be it known that I, VICTOR MORITZ GOLDSCHMIDT, a subject of the King of Norway, residing at Christiania, Norway, have invented certain new and useful Improvements in Pigments Containing Titanium-Oxygen Compounds; and I do hereby declare the following to be a full, clear, and exact description of the invention, such as will enable others skilled in the art to which it appertains to make and use the same.

This invention relates to pigments which contain considerable quantities of titanium oxygen compounds, and has for its object an improved pigment of this class and a process of producing such pigment.

As is known the hiding power of a white pigment is attributable to its power of reflecting light. In the usual pigments the refraction takes place at the separating surface between each single pigment particle and the vehicle (for instance linseed oil).

In my other application Sr. No. 196,327, filed October 12, 1917 as a continuation of my prior application Sr. No. 156,983, filed March 23, 1917, is described a pigment in which additional refraction surfaces are introduced by means of providing the single pigment particles with a complex structure, so that each particle will consist of more than one component, the several components having different powers of refraction, whereby the hiding power of the pigment is increased.

In the manufacture of such complex particles it is of advantage to select for the construction of each particle substances with refractive indexes, which are as different as possible.

According to the present invention silicon dioxid (with a refractive index down to 1.46 in sodium light) is used as a constituent of the pigment together with titanium dioxid (with a refractive index up to 2.71 in sodium light). Complex pigment particles containing these substances could be produced in various manners.

A preferred method of producing such pigments consists in combining amorphous silicon dioxid, which has the lowest refractive index of the various modifications of silicon dioxid, with crystalline titanium dioxid in a modification corresponding to the mineral rutile, which has the highest refractive index of the various modifications of titanium dioxid.

Such complex particles consisting of amorphous silicon dioxid and the crystalline rutile modification of titanium dioxid are produced in the following manner.

Amorphous silicon dioxid or a hydrate of this compound is brought into contact with a solution containing a soluble titanium salt for instance an aqueous sulfuric acid solution of titanium sulfate, one part by weight of $TiO_2$ to ten parts by weight of $SiO_2$ being for instance employed.

The solution is evaporated whereby a residuum is obtained consisting principally of amorphous silica or hydrated silica respectively mixed with titanium hydroxid and sulfuric acid compounds of titanium.

The residuum is calcined, whereby its content of titanium compound is converted into anhydrous titanium dioxid, the titanium dioxid being at suitable temperatures (for instance about 1000° centigrade) obtained in a crystalline form.

A microscopical examination of the resulting product shows that the crystalline titanium dioxid is separated in the form of small rutile crystals in and around the amorphous silicon dioxid particles.

These complex particles provide a white pigment of a very high hiding power and of a high power of resistance against chemical influences whether they are incorporated in a vehicle (for instance linseed oil) alone or mixed with other pigments or fillers.

In my aforesaid application Sr. No. 196,327 I have disclosed a pigment comprising titanium dioxid in a more or less crystalline formation alone or associated with amorphous titanium dioxid or with a sulfate of an alkaline earth metal or both, and a process of obtaining such a pigment involving the heating of an amorphous titanium dioxid compound to a sufficient temperature to produce the desired crystallization, and I have therein broadly claimed such a process and a pigment without limitation to the presence therein or the character of other substances which may be associated with the crystalline titanium dioxid, and I do not therefore herein make claims reading on such prior application but what I do claim herein and desire to secure by Letters Patent of the United States is:—

1. A pigment comprising complex particles containing amorphous silicon dioxid and titanium dioxid.

2. A pigment comprising complex particles substantially consisting of amorphous silicon dioxid and crystalline titanium dioxid.

3. The process of producing pigments which comprises the evaporation of a solution containing titanium compounds and amorphous silica.

4. The process of producing pigments, which comprises the evaporation of a solution containing titanium compounds and amorphous silica to dryness and heating the residuum to expel water and sufuric acid.

5. The process of producing pigments, which comprises the evaporation of a solution containing titanium compounds and amorphous silica to dryness and heating the residuum to expel water and sulfuric acid, the said heating being continued so far and at so high temperatures that titanium dioxid is converted into crystalline form.

6. The process of producing a complex pigment containing artificially crystallized titanium oxid and silica, which comprises heating a compound of titanium containing oxygen together with a compound of silicon to a sufficiently high temperature to effect crystallization in the titanium oxid.

7. The process of producing a complex pigment containing artificially crytallized titanium oxid and a solid oxid of another element having a refractive index different therefrom, which comprises heating a compound of titanium containing oxygen together with an oxygen compound of such other element to a sufficiently high temperature to effect crystallization of the titanium oxid.

8. The process of producing a complex pigment comprising titanium oxid, characterized by being partly amorphous and partly crystalline in structure and having intermingled with the titanium oxid a solid oxid of another element which consists of heating a compound of titanium containing oxygen together with a compound of such element to a sufficiently high temperature to effect partial crystallization in the titanium oxid.

In testimony that I claim the foregoing as my invention, I have signed my name in presence of two subscribing witnesses.

VICTOR MORITZ GOLDSCHMIDT.

Witnesses:
C. Varman,
C. Fabricius Hansen.